United States Patent
Tomizawa et al.

(10) Patent No.: US 12,083,056 B2
(45) Date of Patent: Sep. 10, 2024

(54) INFECTION CONTROL VEHICLE

(71) Applicant: TOYOTA JIDOSHA KABUSHIKI KAISHA, Toyota (JP)

(72) Inventors: Ryota Tomizawa, Susono (JP); Shozo Takaba, Chiryu (JP); Ayako Shimizu, Numazu (JP); Hojung Jung, Shizuoka-ken (JP); Daisuke Sato, Toyota (JP); Yasuhiro Kobatake, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 316 days.

(21) Appl. No.: 17/724,995

(22) Filed: Apr. 20, 2022

(65) Prior Publication Data
US 2022/0401277 A1  Dec. 22, 2022

(30) Foreign Application Priority Data
Jun. 17, 2021 (JP) .................. 2021-101095

(51) Int. Cl.
*A61G 3/00* (2006.01)
*B62D 25/20* (2006.01)

(52) U.S. Cl.
CPC .............. *A61G 3/008* (2013.01); *B62D 25/20* (2013.01)

(58) Field of Classification Search
CPC .... A61G 3/008; B62D 35/20; B62D 25/2072; B60N 3/048; B60H 3/0085
See application file for complete search history.

(56) References Cited

U.S. PATENT DOCUMENTS

| | | | |
|---|---|---|---|
| 11,548,427 B1* | 1/2023 | Shanmuga Sundaram ............. B62D 25/20 |
| 2003/0029477 A1* | 2/2003 | Dean .................. A47L 23/266 134/6 |
| 2004/0099456 A1* | 5/2004 | Cohen .................. B62D 25/081 180/68.3 |
| 2005/0160549 A1* | 7/2005 | Dean .................. A47L 23/266 15/215 |
| 2021/0086840 A1* | 3/2021 | Glickman ............. B62D 25/24 |
| 2021/0197899 A1* | 7/2021 | Hirose ................ B62D 25/20 |
| 2022/0040364 A1* | 2/2022 | Meinke ................ A61L 9/20 |
| 2022/0250443 A1* | 8/2022 | Tomizawa ......... B60H 1/00742 |
| 2023/0029479 A1* | 2/2023 | Bobel ................ B60R 16/04 |

FOREIGN PATENT DOCUMENTS

| | | | | |
|---|---|---|---|---|
| JP | H0576559 U | * | 10/1993 | |
| JP | H10-278786 A | | 10/1998 | |
| JP | 2000096809 A | * | 4/2000 | ............ E04F 15/02 |
| JP | 3263842 B2 | * | 3/2002 | |
| JP | 2006123906 A | * | 5/2006 | ........ B29C 33/3835 |
| JP | 2007222386 A | * | 9/2007 | |
| JP | 2008148963 A | * | 7/2008 | |
| JP | 3136496 U | * | 10/2009 | |
| JP | 3154650 U | * | 10/2009 | |
| JP | 2012112757 A | * | 6/2012 | ............ G01M 9/067 |
| JP | 2014193151 A | * | 10/2014 | |
| JP | 2022038447 A | * | 3/2022 | |
| WO | WO-2021060810 A1 | * | 4/2021 | ............ B60N 3/044 |

\* cited by examiner

*Primary Examiner* — Lori Lyjak
(74) *Attorney, Agent, or Firm* — Dinsmore & Shohl LLP

(57) ABSTRACT

An infection control vehicle includes a floor material. The floor material includes a plurality of holes that is open on an upper end. The holes are configured to capture a droplet. For example, a dimension of each of the holes is set so that the droplet inside the hole remains inside the hole.

9 Claims, 4 Drawing Sheets

INFECTION CONTROL VEHICLE

CROSS-REFERENCE TO RELATED APPLICATION

This application claims priority to Japanese Patent Application No. 2021-101095 filed on Jun. 17, 2021, incorporated herein by reference in its entirety.

BACKGROUND

1. Technical Field

The disclosure relates to an infection control vehicle.

2. Description of Related Art

A floor material for a vehicle is publicly known in which a vibration control composite aluminum alloy sheet with a two-layer structure having an aluminum alloy sheet and a damping plastic is used as a surface plate and a backside surface plate of an interior floor (for example, see Japanese Unexamined Patent Application Publication No. 10-278786 (JP 10-278786 A)). This floor material has a flat surface.

SUMMARY

Droplet infection is known as one of infection routes of infectious diseases. Therefore, it is necessary to prevent droplet infections in vehicles. However, no consideration on this is given to the disclosure described in JP 10-278786 A.

According to the disclosure, the following is provided.

Structure 1

An infection control vehicle including a floor material. The floor material includes a plurality of holes opening on an upper end. The holes are configured to capture a droplet.

Structure 2

The infection control vehicle according to structure 1, in which a dimension of each of the holes is set so that the droplet inside the hole remains in the hole.

Structure 3

The infection control vehicle according to structure 1 or 2 further including a capturing layer that is arranged at least in the vicinity of a bottom portion of each of the holes and is configured to capture the droplet.

Structure 4

The infection control vehicle according to structure 3, in which the capturing layer is in a wet state.

Structure 5

The infection control vehicle according to structure 4, in which the capturing layer is in the wet state due to disinfection solution.

Structure 6

The infection control vehicle according to any one of structures 3 to 5 further including a fluid distribution device. The fluid distribution device is configured to supply fluid to the capturing layer in order to maintain the capturing layer in the wet state.

Structure 7

The infection control vehicle according to any one of structures 1 to 6 further including a negative pressure applying device. The negative pressure applying device is configured to apply negative pressure to the bottom portion of each of the holes.

Structure 8

The infection control vehicle according to any one of structures 1 to 7, in which an upper end of a partition wall that defines the holes is curved or tapered.

Structure 9

The infection control vehicle according to any one of structures 1 to 8, in which the holes have a hexagonal section.

It is possible to suppress droplet infection in a vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
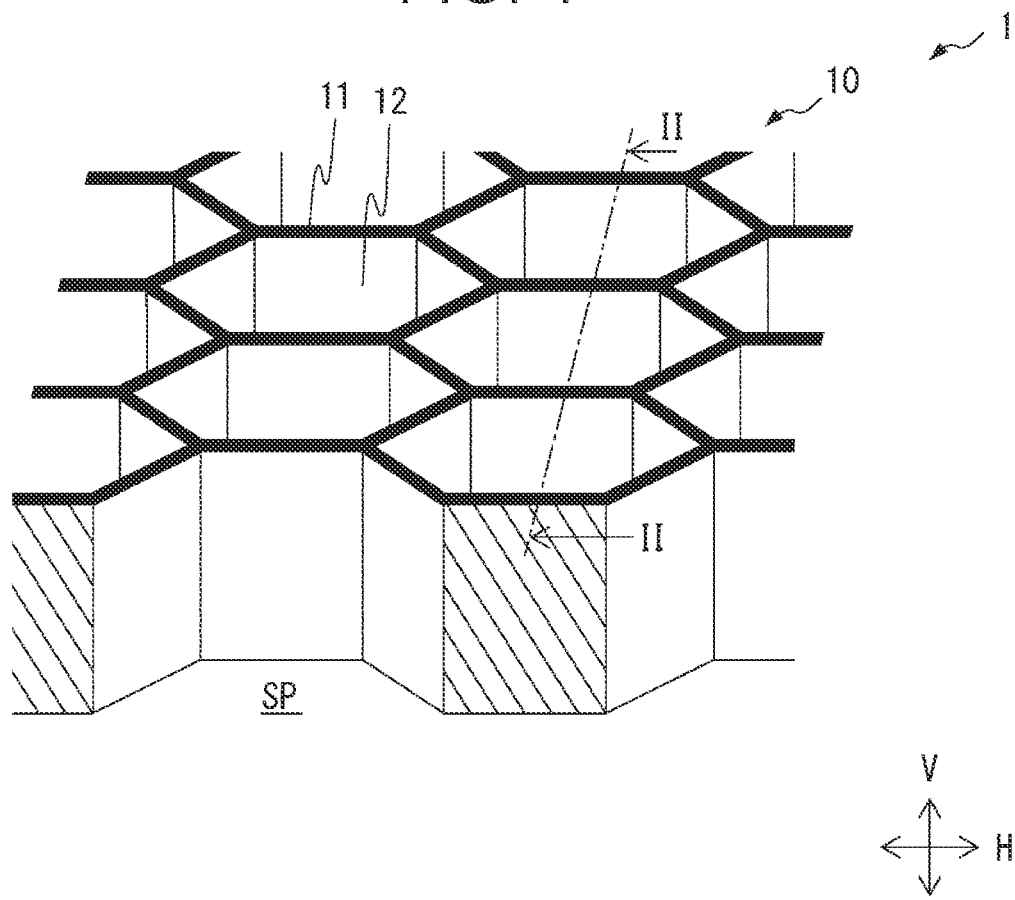
FIG. 1 is a schematic partial perspective view of a floor material according to a first embodiment of the disclosure.
Figure 2:
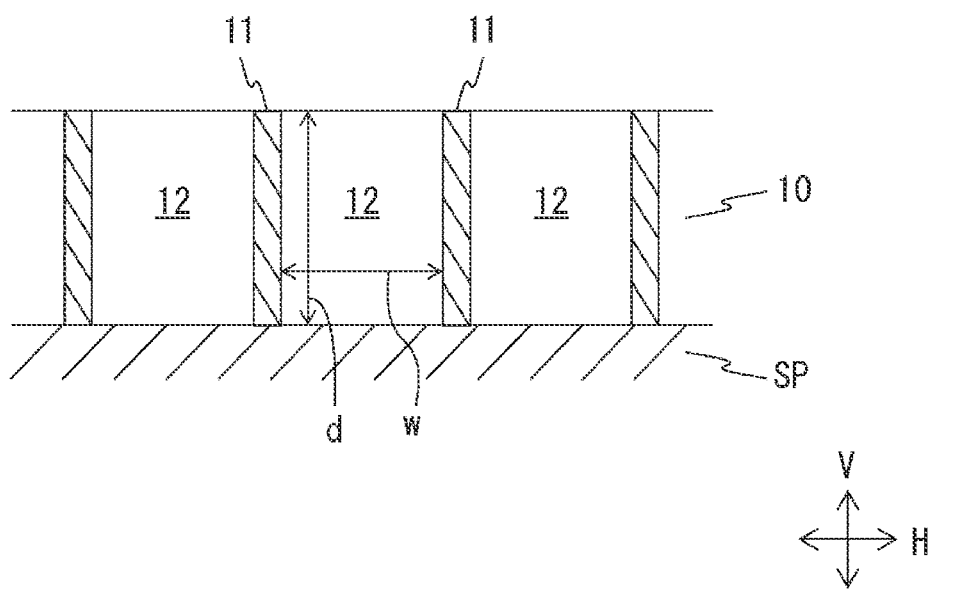
FIG. 2 is a schematic sectional view of the floor material according to the first embodiment of the disclosure taken along the line II-II in FIG. 1.

FIG. 1 and FIG. 2 schematically show a floor material 10 of an infection control vehicle 1 according to a first embodiment of the disclosure. In the first embodiment of the disclosure, the floor material 10 spreads out in a planar form in a horizontal direction H while being supported by a support SP. Further, the floor material 10 includes a plurality of holes 12 defined by partition walls 11. Each of the holes 12 extends in a vertical direction V or a thickness direction of the floor material 10. Further, each of the holes 12 has a hexagonal section. In another embodiment, each of the holes 12 has a circular section, or a polygonal section such as triangle or quadrangle section. Further, each of the holes 12 according to the first embodiment of the disclosure is open on an upper end and a bottom end thereof. In another embodiment, each of the holes 12 is open at an upper end and closed at a bottom end. In other words, the floor material 10 has a honeycomb structure.

In FIG. 2, d represents a depth or a dimension in the vertical direction V of the hole 12, and w represents a width or a dimension in the horizontal direction H of the hole 12. In the first embodiment of the disclosure, the width w of the hole 12 is set so that a shoe of an occupant of the vehicle 1 does not enter the hole 12.

In the first embodiment of the disclosure, since the holes 12 are open at the upper end, once droplets containing viruses and so on reach the floor material 10, the droplets penetrate into the holes 12 and are captured. Therefore, the droplets are suppressed from whirling up within the vehicle 1, and droplet infection within the vehicle 1 is thus suppressed. Further, wastes, dusts, and so on inside the vehicle 1 are also captured inside the holes 12. Therefore, inside of the vehicle 1 is kept clean.

However, when an occupant of the vehicle 1 walks on top of the floor material 10, the sole of the occupant's shoe is pushed against the floor material 10. As a result, the sole is deformed and may enter the holes 12, and the droplets inside the holes 12 may be taken out by the sole. Therefore, in the first embodiment of the disclosure, the dimensions of the holes 12 (for example, the width w and the depth d) are set so that the droplets are suppressed from being taken out from the holes 12, in other words, that the droplets inside the holes 12 remain inside the holes 12.

Figure 3:
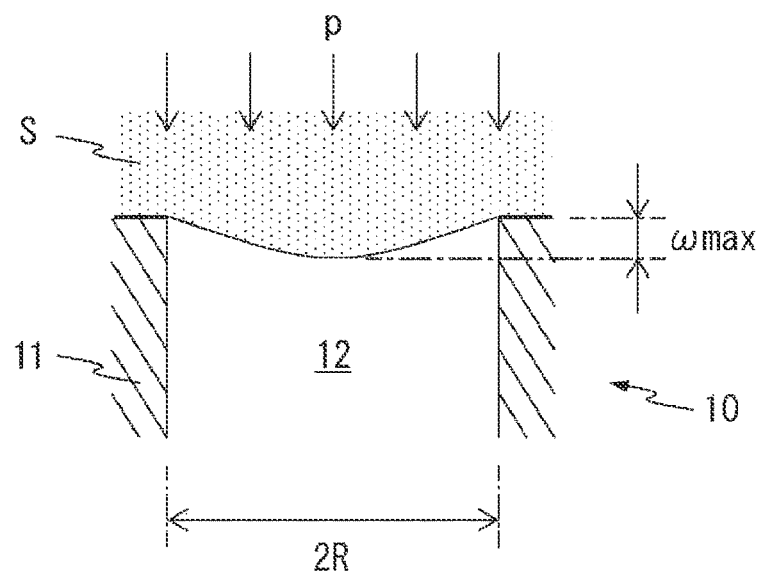
FIG. 3 is a schematic view of the floor material describing an example of a method for setting a dimension of a hole.

Next, with reference to FIG. 3, an example of setting the dimensions of the holes 12 is described. A maximum deflection w max (mm) of the sole S when the sole S is pushed against the floor material 10 is expressed by, for example, the following formula where it is assumed that each of the holes 12 has a cylinder shape with an inner diameter 2R (mm) and that a load of the sole S acting on the floor material 10 is even in a planar direction.

$$\omega\ max=\{(5v)\cdot R^4\cdot p\}/\{64\cdot(1+v)\cdot D\}$$

$$D=E\cdot t^3/\{12\cdot(1-v^2)\}$$

Here, v represents Poisson's ratio of a material that constructs the sole S, p represents a load per unit area of the sole S acting on the floor material 10 (N/mm^2), E represents a modulus of longitudinal elasticity of the material that constructs the sole S (N/mm^2), and t represents a thickness (mm) of the sole S.

The load p is expressed by, for example, the following formula with use of occupant's weight m (kg), gravitational acceleration G, a factor of safety FS, and a contact area AS (mm^2) of the sole S with the floor material 10.

$$p=m\cdot G\cdot FS/AS$$

Also, the contact area AS is expressed by, for example, the following formula with use of a foot length LF (mm) and a foot width WF (mm) of the occupant.

$$AS=LF\cdot WF/2$$

Therefore, for example, when R=25, v=0.5 (when the sole S is formed with from natural rubber), E=1.0 (when the sole S is formed from natural rubber), t=15, m=70, FS=2, LF=230, and WF=80, the maximum deflection w max is about 8.9 mm.

In the example of dimension setting for the hole 12, the depth d (FIG. 2) of the hole 12 is set to be larger than the maximum deflection w max. In the example described above, the depth d of the hole 12 is set to be, for example, 9 mm or larger. As a result, the droplets inside the holes 12 are suppressed from being taken out by the deformed sole. In other words, the droplets inside the holes 12 remain in the holes 12. As understood from the description above, once the inner diameter 2R or the width w of the hole 12 is set, the maximum deflection w max is determined. Therefore, it is possible to set the depth d of the hole 12 when the width w of the hole 12 is set. Alternatively, once the depth d of the hole 12 is set, it is possible to set the width w of the hole 12.

Figure 4:
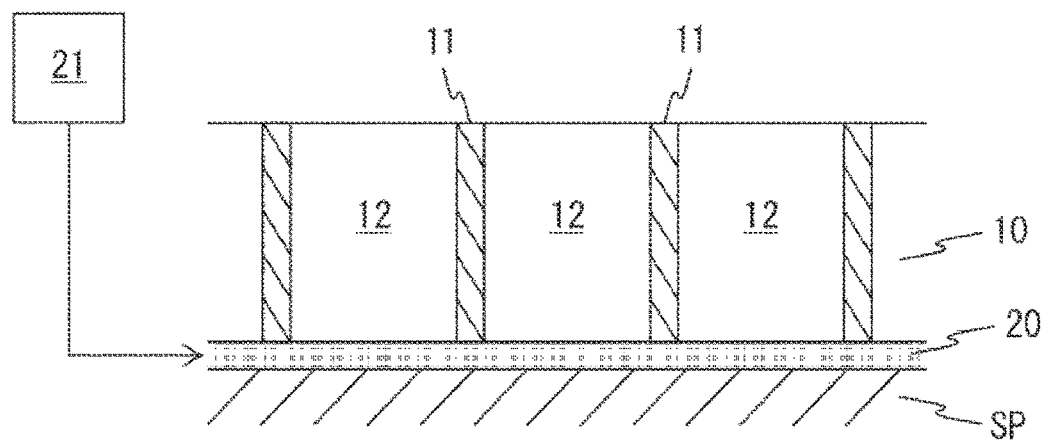
FIG. 4 is a schematic sectional view similar to FIG. 2 describing an example of a floor material according to a second embodiment of the disclosure.
Figure 4:
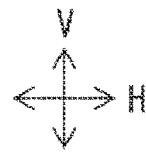
Figure 5:
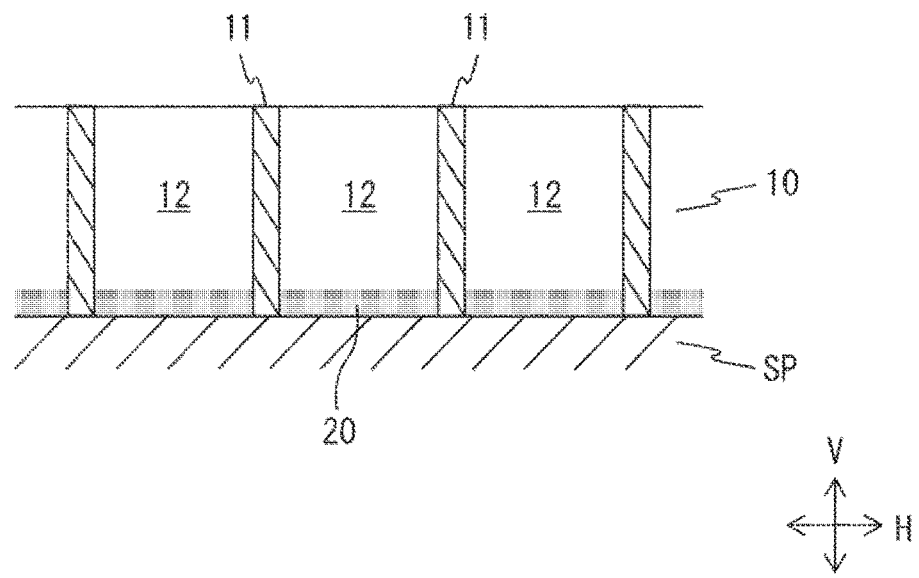
FIG. 5 is a schematic sectional view similar to FIG. 2 describing another example of the floor material according to the second embodiment of the disclosure.

FIG. 4 and FIG. 5 show a second embodiment of the disclosure. A difference of the second embodiment of the disclosure from the first embodiment of the disclosure is that a capturing layer 20 is provided at least in the vicinity of a bottom portion of the floor material 10 in order to capture the droplets. In the example shown in FIG. 4, the capturing layer 20 spreads in the horizontal direction between the floor material 10 and the support SP. In the example shown in FIG. 5, the capturing layer 20 is arranged on the bottom portion of the inner space of each of the holes 12. In another example, the capturing layer 20 is arranged on a side portion, the inner space, and so on of each of the holes 12. As a result, the droplets are captured by the capturing layer 20 reliably.

The capturing layer 20 according to the second embodiment of the disclosure is made from cloth such as woven fabric and non-woven fabric. Also, the capturing layer 20 according to the second embodiment of the disclosure is in a wet state. As a result, the droplets are captured by the capturing layer 20 more reliably. In an example, the capturing layer 20 is wet with disinfection solution (such as alcohol). Thus, viruses and so on contained in the droplets perish. In another example, the capturing layer 20 is wet with water.

Further, in the example shown in FIG. 4, a fluid distribution device 21 is provided. The fluid distribution device 21 supplies fluid to the capturing layer 20 so that the capturing layer 20 is maintained in the wet state. As a result, the capturing layer 20 is maintained in the wet state reliably, and the droplets are captured by the capturing layer 20 even more reliably. In the example shown in FIG. 4, a fluid discharge port of the fluid distribution device 21 is connected to, for example, a side end of the capturing layer 20. The fluid supplied to the side end of the capturing layer 20 is supplied to the entire capturing layer 20 due to a capillary phenomenon of the capturing layer 20. In another example, the fluid distribution device 21 supplies the fluid to the capturing layer 20 while dispersing droplets of the fluid from above the floor material 10 or the capturing layer 20.

Figure 6:
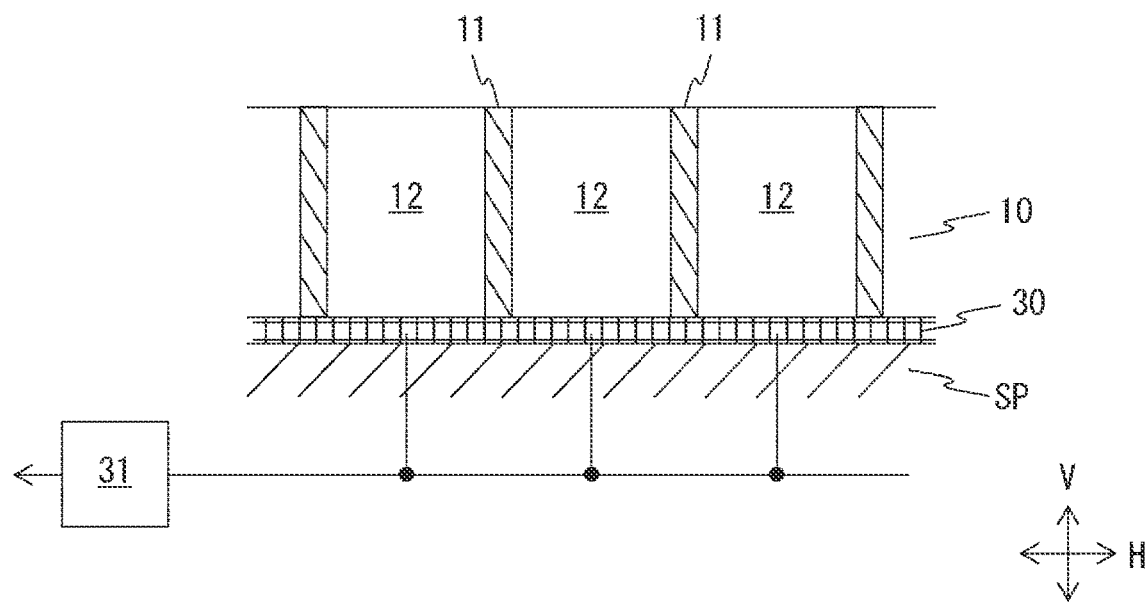
FIG. 6 is a schematic sectional view similar to FIG. 2 describing an example of a floor material according to a third embodiment of the disclosure.

FIG. 6 shows a third embodiment of the disclosure. A difference of the third embodiment of the disclosure from the first embodiment of the disclosure is that negative pressure is applied to a bottom portion of each of the holes 12. In an example shown in FIG. 6, a filter 30 is provided in the vicinity of the bottom portion of each of the holes 12, and a suction port of a negative pressure generating device 31 is connected with the bottom portion of each of the holes 12 through the filter 30. As a result, the droplets are captured inside the holes 12 even more reliably.

In the example shown in FIG. 6, the filter 30 spreads out in the horizontal direction between the floor material 10 and the support SP. In another example, the filter 30 is arranged in, for example, the bottom portion of inside space of each of the holes 12. Meanwhile, the negative pressure generating device 31 is made of, for example, an electric pump.

In yet another embodiment of the disclosure, the capturing layer 20 according to the second embodiment of the disclosure is used as the filter 30 according to the third embodiment of the disclosure. Thus, the droplets are captured by the capturing layer 20 even more reliably, and smell of the fluid that makes the capturing layer 20 wet (for example, smell of alcohol) is suppressed from spreading in the vehicle 1.

Figure 7A:
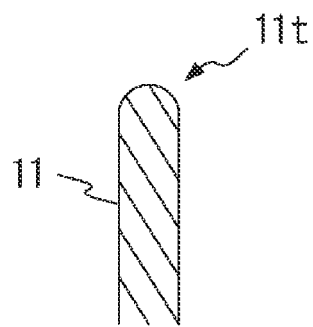
FIG. 7A is a schematic partial sectional view of partition walls according to another embodiments of the disclosure.
Figure 7B:
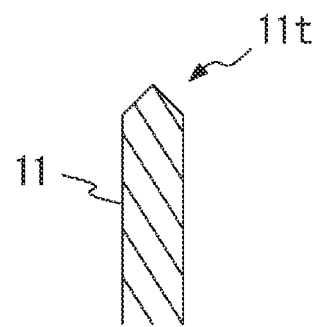
FIG. 7B is a schematic partial sectional view of partition walls according to another embodiments of the disclosure.

In the embodiments of the disclosure described so far, an upper end of the partition wall 11 is flat. On the contrary, in an embodiment shown in FIG. 7A, an upper end 11t of the partition wall 11 is curved. Meanwhile, in an embodiment shown in FIG. 7B, an upper end 11t of the partition wall 11 is tapered. Thus, the droplets attached to the upper end of the partition wall 11 enter the holes 12 easily.

What is claimed is:

1. An infection control vehicle comprising a floor material that includes a plurality of holes opening on an upper end, wherein the holes are configured to capture a droplet.

2. The infection control vehicle according to claim 1, wherein a dimension of each of the holes is set so that the droplet inside the hole remains in the hole.

3. The infection control vehicle according to claim 1 further comprising a capturing layer that is arranged at least in the vicinity of a bottom portion of each of the holes and is configured to capture the droplet.

4. The infection control vehicle according to claim 3, wherein the capturing layer is in a wet state.

5. The infection control vehicle according to claim 4, wherein the capturing layer is in the wet state due to disinfection solution.

6. The infection control vehicle according to claim 3 further comprising a fluid distribution device configured to supply fluid to the capturing layer in order to maintain the capturing layer in the wet state.

7. The infection control vehicle according to claim 1 further comprising a negative pressure applying device configured to apply negative pressure to the bottom portion of each of the holes.

8. The infection control vehicle according to claim 1, wherein an upper end of a partition wall that defines the holes is curved or tapered.

9. The infection control vehicle according to claim 1, wherein the holes have a hexagonal section.

* * * * *